Oct. 14, 1969  L. A. DINE ET AL  3,472,588

LECTERN-PROJECTOR COMBINATION

Filed Aug. 2, 1966

INVENTORS
LESTER A. DINE
EDGAR S. LEMMEY

BY

ATTORNEYS

3,472,588
LECTERN-PROJECTOR COMBINATION
Lester A. Dine, 145 Grist Mill Lane, Great Neck, N.Y.
11023, and Edgar S. Lemmey, 56 Stirling Ave., Freeport, N.Y. 11520
Filed Aug. 2, 1966, Ser. No. 569,715
Int. Cl. G03b 21/28, 21/10
U.S. Cl. 353—42    8 Claims

ABSTRACT OF THE DISCLOSURE

Lectern-projector combination comprising a housing, a slide projector mounted within the housing for projecting an image via a plurality of mirrors upon a screen in the front face of the lectern. In the rear wall of the lectern, there is provided an opening of a size and location to permit the speaker to directly view the image on the screen from the rear thereof and, if desired, to use a pointer for directing attention to the image on the screen. A control button connected to a remote-control cable is mounted on the outside of the housing for activating the slide changing apparatus while the speaker continues his lecture. A control knob is also provided on the outside of the housing which is connected by a cable to the focusing apparatus of the projector to permit focusing of the image cast upon the screen.

---

Figure 1:
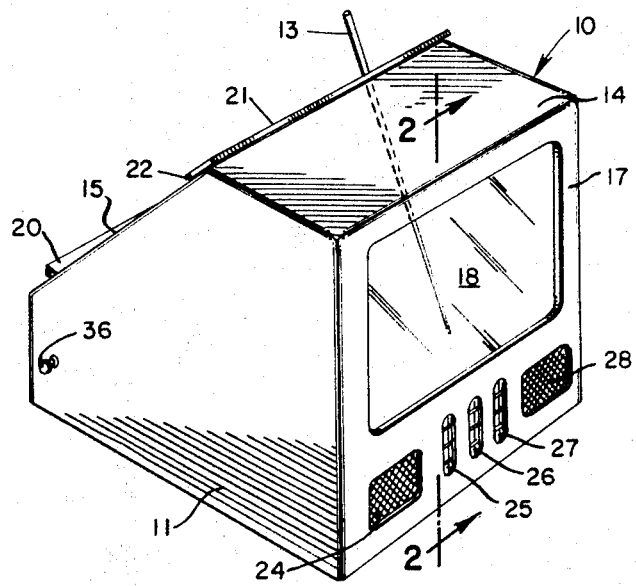

The present invention relates to a lectern-projector combination, particularly a lectern which houses projection means for projecting an image upon a screen in the front face of the lectern and permits the speaker to observe through a viewing slot the image on the screen from the rear and, is desired, to use a pointer or similar instrument for directing attention to the image.

Heretofore the usual visual teaching aids which projected an image on a screen enabled a speaker to illustrate his discussion with writings, sketches, graphs, slides, etc. without resort to the use of a blackboard. In many instances such visual teaching aids are designed so that the image is projected on a screen in back of the speaker. Such an arrangement requires the speaker to turn his back to the audience if he should desire to direct attention to the image with a pointer or observe the image while he continues his lecture. In other visual teaching aids the screen is located in front of the speaker and housed in a cabinet. This construction prevents the speaker from viewing the image projected on the screen while he is presenting his talk, discussion, etc. This has numerous obvious disadvantages including: the speaker is unable to refresh his recollection by actually observing the image he is discussing; the speaker cannot determine whether the correct image is being projected on the screen, particularly where slides are being projected which may inadvertently have not been placed in the correct order in the projector; and the speaker is unable to use a pointer to aid in his discussion of the image on the screen.

The present invention comprises a lectern having a translucent screen in its front face for projecting an image on the screen from a projector housed within the lectern, the lectern having means which enable a person positioned directly in back of the lectern to view the rear surface of the screen and to employ a pointer, if desired, to direct attention to the image reflected on the screen.

In addition the usual visual teaching aids employ, specially designed projectors, which add substantially to the overall cost of the equipment whereas the lectern-projector combination of the present invention offers the advantage of being able to use a standard slide projector. Hence, the lectern-projector combination of the present invention makes use of the normally dead space inside of a conventional lectern and results in a highly versatile, less costly, easily transportable visual teaching aid.

Therefore it is an object of the present invention to provide a lectern-projector combination wherein projection means are housed inside the enclosed lectern cabinet and a screen is mounted in the front face of the lectern for projecting an image thereon which is visible to an audience facing the lectern and at the same time visible to a speaker standing behind the lectern.

A further object of the present invention is to provide a lectern-projector combination with viewing means that enable a speaker standing directly behind the lectern to view the rear surface of the screen on which the image is projected and to insert a pointer through the viewing means for directing attention to the image.

Yet another object of the present invention is to provide a versatile teaching aid comprising a lectern-projector combination.

An additional object of the present invention is to provide a visual teaching aid which employs a standard slide projector.

Figure 2:
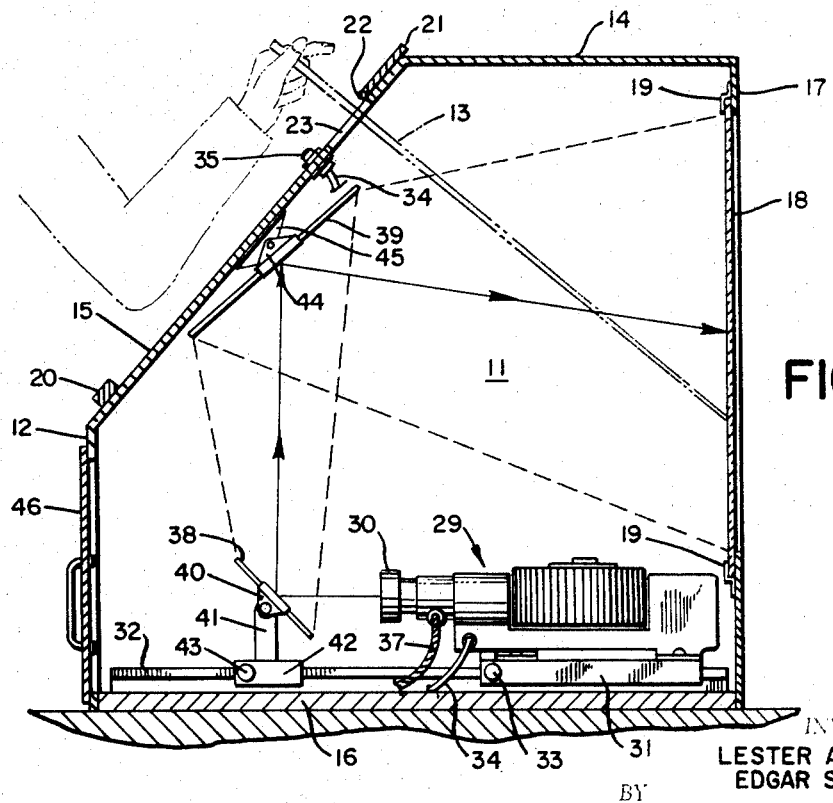
Figure 2:

These and other objects and advantages of the present invention will become apparent from the following detailed description when taken in conjunction with the appended drawings wherein:

FIGURE 1 is a perspective exterior view of a lectern-projector combination according to the present invention; and FIGURE 2 is a longitudinal vertical section taken on the line 2—2 of FIGURE 1.

Referring to FIGURE 1, there is shown a lectern 10 comprising flat vertical side walls 11 and a rear wall 12, a flat horizontal top wall 14, a slanting wall surface 15, a flat bottom wall 16, and a front wall or face 17 supporting a translucent screen 18, all of these walls being secured together to form an enclosed cabinet. The cabinet walls may be secured together in any conventional manner, either permanently or detachably. For example, front face 17 may be hingedly secured (not shown) to bottom wall 16 so as to permit ready opening of front face 17 for interior access. The lectern may be constructed of any desired and well known material such as wood, plastic, lightweight metal, etc. The screen 18 is mounted flush against the inside surface of front face 17 in any suitable way, as by means of mounting clips 19 as shown in FIGURE 2. The screen 18 may be constructed of any suitable material, e.g., ground glass, a rigid plastic such as "Plexiglas," etc.

As shown in FIGURES 1 and 2, the slanted surface 15 of the lectern 10 is adapted to hold the speaker's notes, papers, etc., and is provided with a support bar 20 extending horizontally near the lower edge of the slanted surface 15 to prevent the speaker's material from sliding off slanted surface 15. In the upper portion of the slanted surface 15 there is provided an opening 23 with a suitable removable cover, such as a trapdoor 21, shown connected by hinges 22 to slanted surface 15. When the trapdoor 21 is opened, opening 23 enables the speaker to glance down to the rear surface of the translucent screen 18 and to use a pointer 13 or the like to direct attention to particular portions of the image projected on the screen 18. The opening 23 is positioned to permit convenient observation of the entire rear surface of screen 18 by a person located immediately in back of the lectern 10. Having a trapdoor, or the like for closing opening 23 permits complete enclosure of lectern 10 when not in use, and hence prevents accumulation of dirt, dust, etc. on the inside of the lectern which would interfere with the efficient operation of the projection means housed therein.

Also, as shown in FIGURE 1 there may be mounted in front face 17 outlets 24, 25, 26, 27 and 28 which serve as portals for ventilation of the inside of the lectern, which is necessary because of heat generated by the projector housed therein during operation. In addition, if desired, public-address loud-speakers and amplifiers (not shown) may be mounted in the lectern adjacent one or more of outlets 24 through 28.

As shown in FIGURE 2, a slide projector 29 or other projection means is mounted inside lectern 10. The slide projector 29 may be of any desired type, including a conventional remote-controlled 35 millimeter slide projector such as, for example, a Kodak Carousel model 813, which is provided with a supplementary lens 30 to adapt the projector 29 to the decreased projection distance to screen 18. The selection of lens 30 is based on considerations well understood by those of ordinary skill in this art and need not be described in detail. A three inch lens has been found particularly suitable for use with a Kodak Carousel model 813.

The projector 29 is mounted on a support plate 31 which rides on a rail 32, which is secured to the bottom wall 16 by any suitable means. The projector 29 may be selectively positioned on rail 32 at any point therealong, and may be held in a selected position as by means of lock screw 33 or the like. The projector 29 is provided with a remote-control cable 34 connected to control button 35, preferably located on slanted surface 15 which activates the changing of slides while the speaker may continue his lecture. Obviously, if desired, control button 35 may be located any place which is handy to the speaker's reach. In lieu of a remote control means to change slides, the speaker may manually change slides by an opening in the side of the lectern (not shown). Also a control knob 36 is provided on vertical wall 11, or other location convenient to the speaker's reach, which is connected by cable 37 to the focussing means of projector 29 to permit focussing of the image cast upon screen 18.

Also housed in lectern 10 are first and second reflecting means 38 and 39 each of which may comprise a mirror, prism or the like. First reflecting means 38 is obliquely mounted in front of projector 29 and lens 30 by means of a bracket 40 or the like, pivotally secured to vertical arm 41 which in turn is secured to support plate 42 which rides on rail 32 and is adjustably secured thereto by a lock screw 43 or the like. The second reflecting means 39 is located above the first reflecting means 38 and is supported by a bracket 44 pivotally secured to a support 45 which in turn is fastened on the inside of slanted surface 15. By adjusting first and second reflecting means 38 and 39 alignment of these reflecting means with lens 30 for proper projection is readily maintained.

As is apparent from FIGURE 2, the light from the slide projector proceeds through lens 30 against first reflecting means 38 to be reflected upwardly upon second reflecting means 39 and then onto screen 18. When an image from a slide in the projector 29 is projected on translucent screen 18, the speaker is able to glance through opening 23 and view the image being projected on the translucent screen (although in reverse) at the same time as the audience. Also, if he desires, the speaker may direct a pointer 13 to any selected portion of the image. The pointer will cast a shadow on the screen to designate the image portion being referred to. If desired, a spot of light or similar image may serve as a pointer, by being projected through opening 23 by a hand-held spot projector. Therefore, the speaker is able to determine whether the proper slide is being projected and to use a pointer or other indicator to aid the audience in following his discussion.

The actual loading of projector 29 may be accomplished by sliding projector 29 on rail 32 manually to the rear of the lectern 10 and through sliding door 46 or the like. Alternatively, a door may be provided on the side of the lectern for convenient loading of slides.

Numerous modifications of the present invention are possible. For example, the rear wall of the lectern may be provided with a remote control panel which comprises projector controls and microphone controls for an amplifier system. Also a microphone may be provided with extendible wire leading to an amplifying system so that the speaker may address his audience while standing at a distance from the lectern control panel. The arrangement of the reflecting means can be altered and additional reflecting means may be interposed between the projector and the screen, as may be convenient to arrange for proper projection.

Other modifications and variations will be apparent to those skilled in the art and it is accordingly intended that the scope of the invention not be limited to those embodiments particularly illustrated or suggested, but that the scope of the invention be defined by reference to the appended claims.

The invention claimed is:

1. A lectern-projector combination comprising: a housing having a substantially vertical front wall including a translucent rear-projection viewing screen adapted to be exposed to the view of an audience and a rear wall including an opening of a size and location to permit direct viewing of the entire inner surface of said viewing screen by a person standing at arms length behind said housing; image-projecting means mounted within said housing for projecting an image; and optical reflector means for reflecting the image projected from said projecting means against the inner surface of said viewing screen.

2. A lectern-projector combination according to claim 1 wherein said housing also includes vertical side walls; a top wall; and a bottom wall; at least one of said walls providing access means to the interior of said housing for adjusting said image-projecting means.

3. A lectern-projector combination according to claim 2 wherein the image projecting means comprises a slide projector.

4. A lectern according to claim 3 wherein said rear wall includes a slanted surface of sufficient size to hold papers, and wherein said opening is located in the upper portion of said slanted surface.

5. A lectern-projector combination according to claim 4 wherein said slide projector includes a remote control cable operable outside said housing for changing the image projected on said translucent viewing screen.

6. A lectern-projector combination according to claim 5 wherein said reflecting means comprises a first reflecting surface mounted adjacent the rear of said housing and in front of said slide projector and at least one additional reflecting surface mounted in the upper portion of said housing for receiving the image from said first reflecting surface and projecting said image onto said viewing screen.

7. A lectern-projector combination according to claim 5 wherein said slide projector includes remote control means operable outside said housing for focussing the image from said projector onto said translucent viewing screen.

8. A lectern-projector combination comprising: a housing having vertical side walls, a rear wall, a front wall having a translucent screen mounted therein, a flat bottom wall, a top wall, and a slanting surface, facing a person standing in back of the rear wall of said housing, said slanting surface being of sufficient size to hold papers; a viewing slot located in the upper portion of said slanting surface, said viewing slot being of sufficient size to enable a person standing at arms length in back of said housing to directly view the entire interior surface of said screen through said viewing slot to observe the image projected thereon, said viewing slot being of sufficient size to allow access to the interior of said housing by a person standing in back of said rear wall of said housing using a hand-held pointer to cast a shadow on said screen; a slide projector mounted on the bottom wall of said housing for projecting an image onto said screen; a first optical reflector surface mounted on the bottom wall of said housing, adjacent the rear of said housing and in line with said slide projector, to reflect vertically light from said projector, a second optical reflector surface mounted on the interior of said slanting surface of said housing to receive the light reflected from said first optical reflector surface and to re-reflect said light onto said screen; first remote control means mounted on said housing for controlling said slide projector to change the image projected on said screen; and second remote control means mounted on said housing for controlling said projector to focus said image on said screen.

References Cited

UNITED STATES PATENTS

| | | |
|---|---|---|
| 2,265,992 | 12/1941 | Beck. |
| 2,666,358 | 1/1954 | Eash. |
| 3,159,077 | 12/1964 | Hoag et al. |
| 3,284,155 | 11/1966 | Jensen. |
| 3,343,452 | 9/1967 | Ackermann et al. |
| 3,354,776 | 11/1967 | Smitzer et al. |
| 3,373,654 | 3/1968 | Carolan. |

FOREIGN PATENTS

| | | |
|---|---|---|
| 954,815 | 4/1964 | Great Britain. |
| 1,052,253 | 9/1953 | France. |

NORTON ANSHER, Primary Examiner

RICHARD M. SHEER, Assistant Examiner

U.S. Cl. X.R.

353—76, 78